(12) United States Patent
Middleton-Hand et al.

(10) Patent No.: US 8,331,250 B2
(45) Date of Patent: Dec. 11, 2012

(54) SYSTEM AND METHOD FOR STRATEGIC NETWORK PLANNING

(75) Inventors: Nancy Middleton-Hand, Lenexa, KS (US); David M. Byrne, Shawnee, KS (US); Robert B. Shields, Overland Park, KS (US); Michael W. Stutzman, Overland Park, KS (US); Kenneth B. Tedder, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 521 days.

(21) Appl. No.: 12/175,638

(22) Filed: Jul. 18, 2008

(65) Prior Publication Data

US 2010/0014441 A1      Jan. 21, 2010

(51) Int. Cl.
*H04L 12/28* (2006.01)

(52) U.S. Cl. ....... 370/252; 370/254; 705/7.12; 705/7.13

(58) Field of Classification Search .................. 370/252, 370/254; 700/96, 97; 705/4, 8, 9
See application file for complete search history.

(56) References Cited

U.S. PATENT DOCUMENTS

| | | | |
|---|---|---|---|
| 6,185,193 B1 * | 2/2001 | Kawakami et al. | 370/254 |
| 7,251,221 B2 * | 7/2007 | Wall et al. | 370/254 |
| 7,313,534 B2 * | 12/2007 | Scheer | 705/9 |
| 7,333,866 B2 * | 2/2008 | Knight | 700/96 |
| 7,684,321 B2 * | 3/2010 | Muirhead et al. | 370/230 |
| 2002/0007289 A1 * | 1/2002 | Malin et al. | 705/4 |
| 2004/0095907 A1 | 5/2004 | Agee et al. | |
| 2007/0067196 A1 * | 3/2007 | Usui | 705/8 |
| 2007/0147264 A1 * | 6/2007 | Zolfaghari et al. | 370/252 |
| 2008/0259815 A1 | 10/2008 | Gorman | |
| 2009/0196185 A1 | 8/2009 | Stipanovich et al. | |
| 2009/0319952 A1 * | 12/2009 | Riegel | 715/841 |

OTHER PUBLICATIONS

U.S. Appl. No. 12/012,135; Final Rejection dated Sep. 28, 2010; 17 pages.
U.S. Appl. No. 12/012,135; Non-Final Rejection dated May 27, 2010; 15 pages.

* cited by examiner

*Primary Examiner* — Robert Wilson
*Assistant Examiner* — Brian O Connor
(74) *Attorney, Agent, or Firm* — Swanson & Bratschun, L.L.C.

(57) ABSTRACT

A system and method for strategic network planning includes a service forecast module that determines a forecasted service need for additional telecommunication network services. A network equipment module is in communication with the service forecast module. The network equipment module is operable to determine an equipment need for telecommunications network equipment in response to the determined forecasted service need. The equipment need includes a list of equipment that is desired to meet the forecasted service need. A task module is also in communication with the network equipment module. The task module is operable to determine task needs in response to the determined equipment need. The task needs include a list of tasks that need to be completed to meet the equipment need. A project module is also in communication with the task module. The project module is operable to calculate a project start date. The project start date is calculated in response to the determined task needs. The project module is further operable to automatically initiate at least one task by the project start date.

17 Claims, 5 Drawing Sheets

SYSTEM AND METHOD FOR STRATEGIC NETWORK PLANNING

BACKGROUND

Presently, decisions regarding the investment of capital in network infrastructure are made on an ad hoc basis resulting in the delayed purchasing and deployment of needed network resources. Frequently, such a delay causes network congestion when the predicted conditions giving rise to the need for additional network equipment actually occur in advance of the deployment date of such network resources. Additionally, such decisions are usually reactive instead of proactive and focus on current network constraints and activities rather than predictions and trends in network constraints and activities. Once decisions to invest in additional capital for a network are made, the process to implement such additional capital in the network is often cumbersome, disjointed, and inefficient.

SUMMARY

In one embodiment, a system and method for strategic network planning is disclosed. The system includes a service forecast module that determines a forecasted service need for additional telecommunication network services. A network equipment module is in communication with the service forecast module. The network equipment module is operable to determine an equipment need for telecommunications network equipment in response to the determined forecasted service need. The equipment need includes a list of equipment that is desired to meet the forecasted service need. A task module is also in communication with the network equipment module. The task module is operable to determine task needs in response to the determined equipment need. The task needs include a list of tasks that need to be completed to meet the equipment need. A project module is also in communication with the task module. The project module is operable to calculate a project start date. The project start date is calculated in response to the determined task needs. The project module is further operable to automatically initiate at least one task by the project start date.

BRIEF DESCRIPTION OF THE DRAWINGS

Illustrative embodiments of the present invention are described in detail below with reference to the attached drawing figures, which ate incorporated by reference herein and wherein.

DETAILED DESCRIPTION OF THE INVENTION

Figure 1:
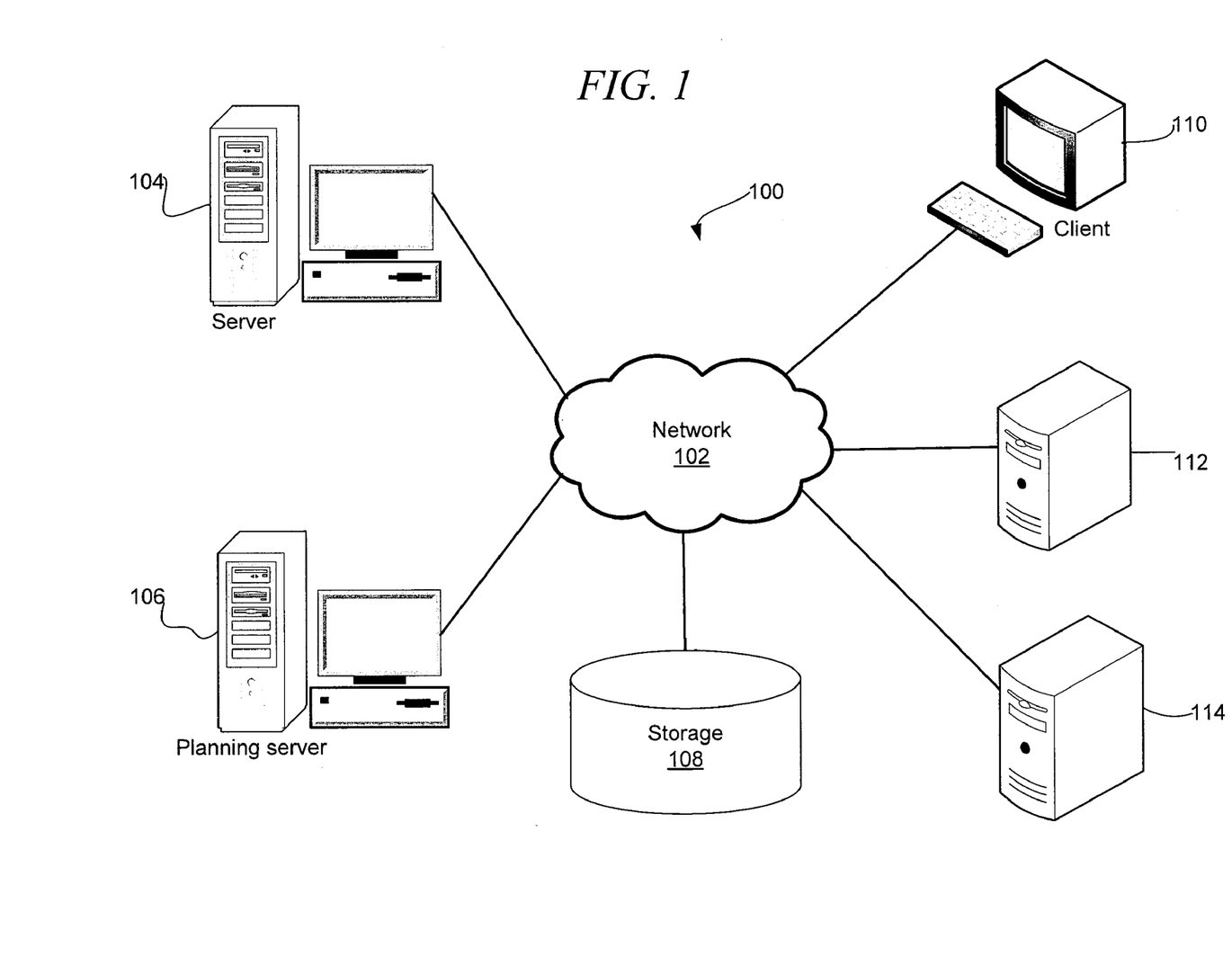
FIG. 1 is a pictorial representation of one embodiment of a network of data processing systems.
Figure 2:
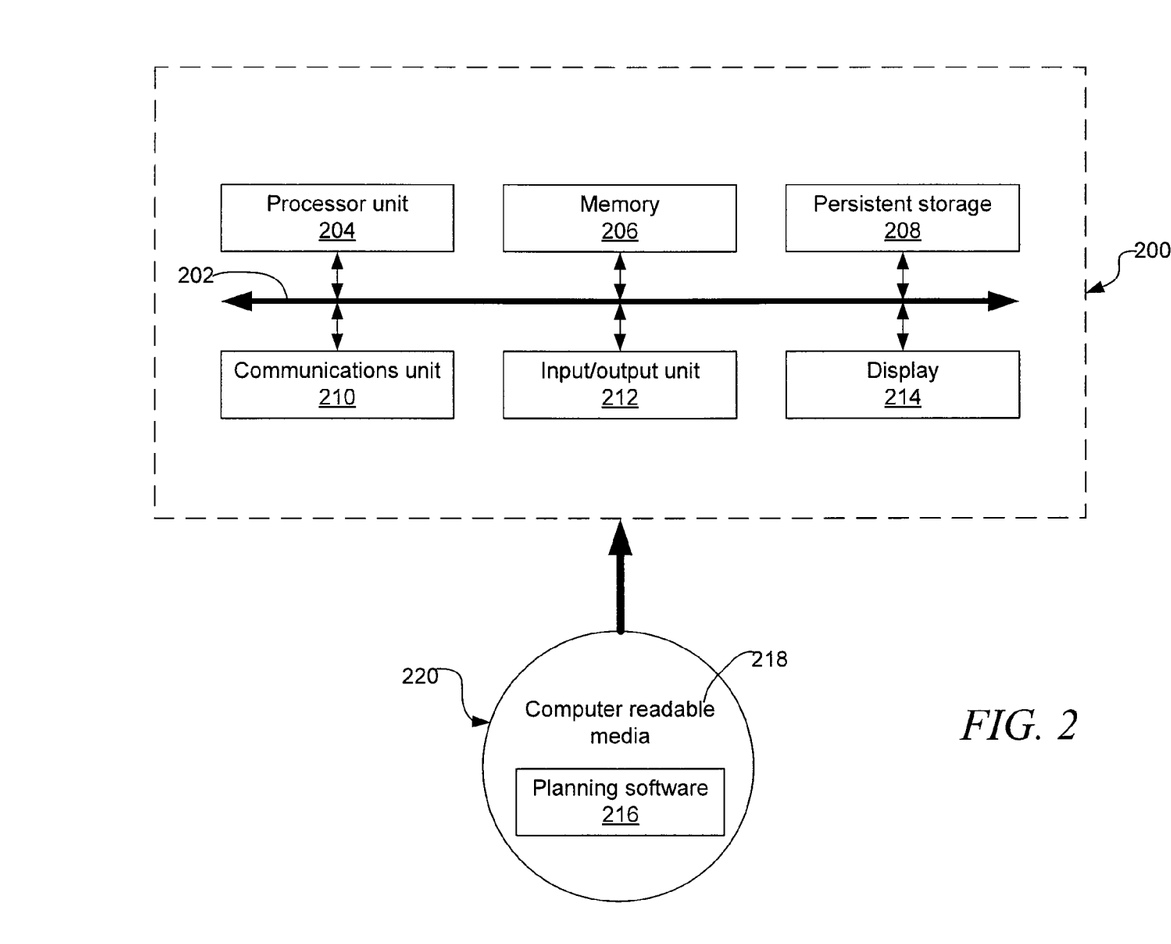
FIG. 2 is a block diagram of one embodiment of a data processing system.

With reference now to the figures and in particular with reference to FIGS. 1 and 2, diagrams of data processing environments are provided in which illustrative embodiments may be implemented. It should be appreciated that FIGS. 1 and 2 are only examples and are not intended to assert or imply any limitation with regard to the environments in which different embodiments may be implemented. Many modifications to the depicted environments may be made.

FIG. 1 depicts a pictorial representation of a network of data processing systems 100 in which illustrative embodiments may be implemented. Network data processing system 100 is a network of computers in which the illustrative embodiments may be implemented. Network data processing system 100 contains a network 102, which is the medium used to provide communication links between various devices and computers connected together within network data processing system 100. Network 102 may include connections, such as twisted pair connections, coaxial cables, fiber optics, or other suitable wired or wireless, dedicated or switched, communication links. In one example, network 102 is a wireless network that may be used by phone service providers to transmit data.

In the depicted example, a server 104 and a planning server 106 connect to network 102 along with a storage unit 108. In addition, clients 110, 112, and 114 connect to network 102. Clients 110, 112, and 114 may be any communication devices. Communication devices are commonly used in a wide variety of commercial, governmental, and personal applications. A communication device is any device capable of communicating with a user or another device. Non-limiting examples of communication devices include phones, which include landline and cellular phones, personal computers, personal digital assistants, music players, and laptop computers. Communication devices allow a user to execute a wide variety of applications, including executing voice calls, text messaging, internet browsing, music playback, memo recording, personal organization functions, e-mail, instant messaging, camera and camcorder applications, radio reception, video games, and modem functions for other devices. In the example of FIG. 1, clients 112 and 114 are cellular phones. Clients 110, 112, and 114 are clients to servers 104 and 106 in this example. Network data processing system 100 may include additional servers, clients, and other devices not shown.

In this example, network 102 may provide a wireless communications network that allows clients 110, 112, and 114 to communicate with one another. The wireless communications network, including servers 104 and 106, may be managed by a service provider. In the depicted example, server 104 may provide data, such as boot files and applications to clients 110, 112, and 114. Planning server 106 hosts a software application that allows users of network data processing system 100 to automatically determine when to initiate the purchase or deployment of additional capital resources for a network such as additional network equipment or cabling. More particularly, planning server 106 may receive information from clients 110, 112, and 114 and use such information to determine the appropriate time to initiate purchase or deployment decisions by a service provider. For example, information regarding the sale of services to additional customers or the predicted expansion of residential construction in a particular geography may be utilized to initiate the installation of an additional switch for the network by a particular date. Planning server 106 may then send and receive messages from users of clients 110, 112, and 114 in order to initiate, approve, and monitor the progress of tasks that are necessary to complete an installation or deployment of additional network resources.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), a wide area network (WAN), or a CDMA network. FIG. 1 is intended as an example, and not as an architectural limitation for the different illustrative embodiments. For example, network data processing system 100 may be implemented as any network that may be used to facilitate communication between communication devices.

With reference now to FIG. 2, a block diagram of a data processing system 200 is shown in which illustrative embodiments may be implemented. Data processing system 200 is an example of a communication device or computer, such as servers 104 or 106 or clients 110, 112, and 114 in FIG. 1, in which computer-usable program code or instructions implementing the processes may be located for the illustrative embodiments. In one non-limiting example, data processing system 200 may be a cellular phone. Data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Memory 206 may store the assigned value of a variable. For example, memory 206 may contain the value given to a variable in a variable assignment. These values may also be contained in registers that are included in memory 206.

Communications unit 210, in these examples, provides for communications with other data processing systems or communication devices. In these examples, communications unit 210 is a network interface card. Communications unit 210 may provide communications through the use of either or both physical and wireless communication links.

Input/output unit 212 allows for the input and output of data with other devices that may be connected to data processing system 200. For example, input/output unit 212 may provide a connection for user input through a keyboard and mouse. Further, input/output unit 212 may send output to a printer. In the case in which data processing system 200 is a cellular phone, input/output unit 212 may also allow devices to be connected to the cellular phone, such as microphones, headsets, and controllers. Display 214 provides a mechanism to display information to a user. In the case in which data processing system 200 is a cellular phone, display 214 may be a graphical user interface on the cellular phone. In one non-limiting example, the display 214 may be used to display a prompt or a notification on the cell phone, such as prompt 140 or notification 142 in FIG. 1.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Planning software 216 is located in a functional form on computer-readable media 218 and may be loaded onto or transferred to data processing system 200 for execution by processor unit 204. Planning software 216 and computer-readable media 218 form computer program product 220 in these examples. In one embodiment, computer program product 220 is a computer program product for planning and initiating the purchase or deployment of additional network resources by a service provider. For example, computer program product 220 may be a non-limiting example of the planning software program running on planning server 106 in FIG. 1, or an application deployed to any one of clients 110, 112, or 114 in FIG. 1 that facilitates the planning and initiation of additional resources such as network equipment being deployed to a particular network. Additional details regarding planning software 216 on computer program product 220 are described in the figures below.

In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 may also take the form of a persistent storage, such as a hard drive or a flash memory that is connected to data processing system 200. The tangible form of computer-readable media 218 is also referred to as computer recordable storage media.

Alternatively, planning software 216 may be transferred to data processing system 200 from computer-readable media 218 through a communication link to communications unit 210 and/or through a connection to input/output unit 212. The communication link and/or the connection may be physical or wireless in the illustrative examples. The computer-readable media also may take the form of non-tangible media, such as communication links or wireless transmissions containing the program code. In the example in which data processing system 200 is a cellular phone, planning software 216 may be deployed to the cellular phone via over the air programming, the Internet, or Bluetooth, either of which may use network 102.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In general, the functionality of the various software modules and hardware devices disclosed in this application may be implemented using any combination of hardware and software in one or more co-located or distributed physical or logical locations. Thus, functionality described as being performed by a particular software module resident on a particular hardware device may instead be performed by hardware or software located outside of such device. Similarly, functionality performed by separate software modules may instead be performed by a single hardware or software device. While much of this application is described relative to a client-server architecture, the functionality can instead be implemented in a peer-to-peer or other architecture or configuration.

Figure 3:
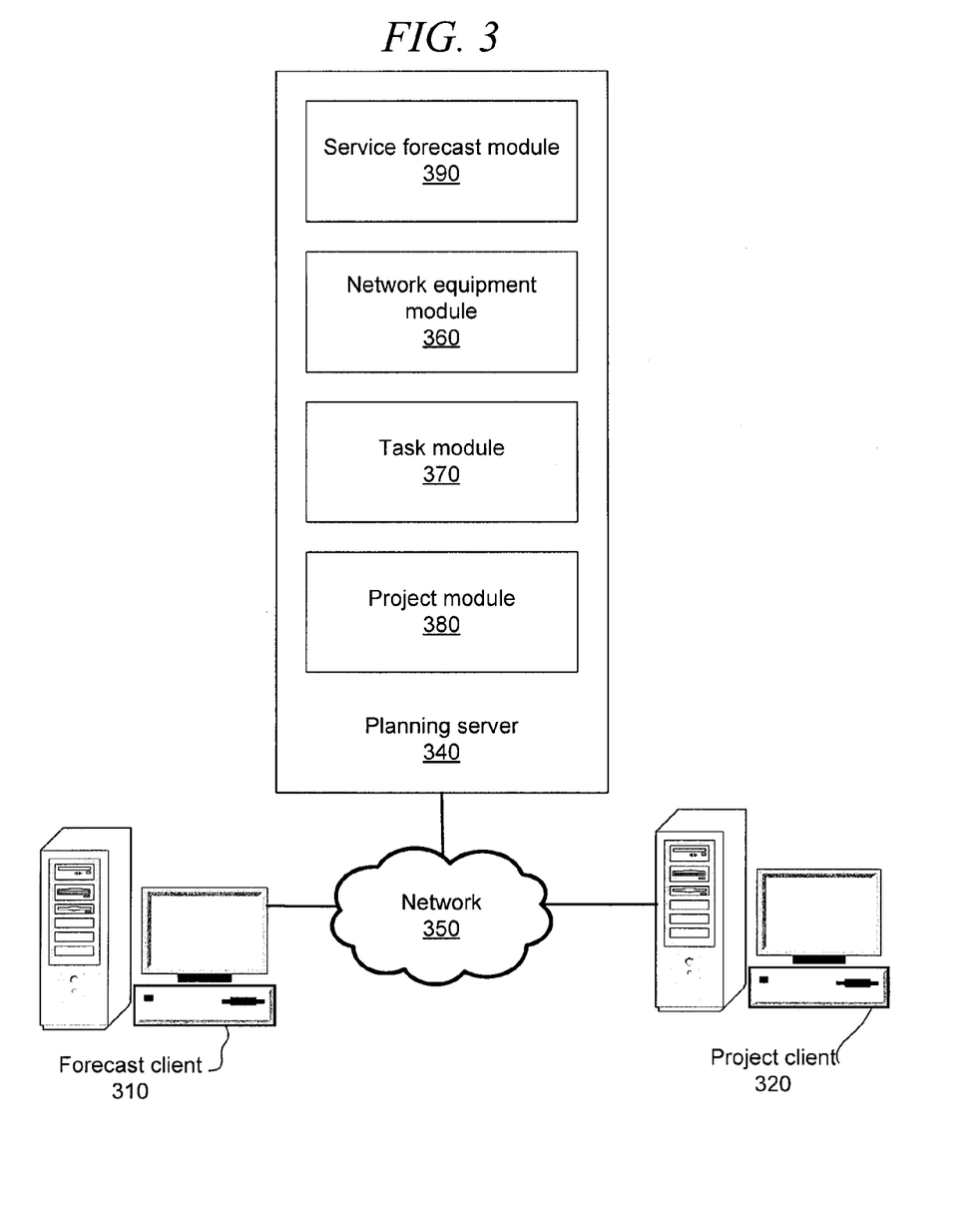
FIG. 3 is an illustration of one embodiment of a forecast client and a project client in communication with a planning server over a network.

FIG. 3 illustrates one embodiment of a forecast client 310 and a project client 320 in communication with a planning server 340 over a network 350.

Forecast client 310 and project client 320 may be any suitable client communication device capable of communicating with planning server 340 over network 350. In one embodiment, forecast client 310 and project client 320 may be clients such as clients 110, 112 and 114 of FIG. 1.

Forecast client 310 allows personnel associated with a network service provider to communicate data regarding the use of a network to planning server 340 using, for example, a web interface or other suitable user interface, messaging application, or portal. For example, forecast client 310 may allow information to be entered and communicated to planning server 340 that is associated with, for example, new customers of network services, increased usage of the network on average or at certain times such as peak times of service, network performance issues, new telecommunications service offerings, planned network changes, or any other type of information that may be useful to determine drivers for additional network equipment or services. For purposes of this application, a driver is a factor, circumstance, change, event, goal, or other piece of data or information relevant to a service provider determining if a change or addition to a network is needed. For example, drivers may include information such as actual or predicted customer growth, actual or predicted bandwidth needed, equipment malfunction, technology advancement, infrastructure change, regulatory change, new service offerings, new construction, new service easements, new roads, or any other suitable information useful in planning a network's design or deployment.

Project client 320 allows decision-makers and implementers to monitor and communicate regarding tasks that need to be completed or approved in order to complete a project such as the installation and deployment of a network device. Such monitoring and communication may take place via the use of electronic messaging such as email, text messaging, voice messaging, web alerts, or any other suitable electronic messaging. Alternatively, such monitoring and communication may take place via the use of a customized or commercially available software program, web interface, or portal.

In one embodiment, network 350 is a local area network. Alternatively, network 350 may be any other suitable network such as network 102 of FIG. 1.

Planning server 340 includes a service forecast module 390, a network equipment module 360, a task module 370, and a project module 380. Each of modules 390, 360, 370 and 380 may be implemented as any combination of hardware and software, whether operating within planning server 340 or in separate network devices disbursed over network 350 or any other suitable network. In one embodiment, modules 390, 360, 370, and 380 are software modules executed by one or more processors of planning server 340 and stored in one or more memory devices of planning server 340.

Service forecast module 390 predicts, forecasts, and triggers the need for a particular network service, device, or other change in infrastructure or configuration relative to a network. In particular, service forecast module 390 considers a variety of factors in order to determine when a new piece of network equipment is necessary for network operation. For example, service forecast module 390 may consider a plurality of drivers in order to determine when additional network equipment is needed.

In one embodiment, drivers may be events requiting or otherwise making it desirable to have a change in a network occur immediately, such as the deployment of new network equipment. In other cases, drivers may be associated with the long-term predicted growth of a network and the amount or types of traffic that are communicated over such network. For example, equipment malfunction, a regulatory change, or a new building where service is needed are all drivers that may require immediate changes to a network. Alternatively, drivers such as customer growth, an increase in bandwidth needed, advancements in technology, or new service offerings may all be forecasted such that a change in the network will be needed at a need date that is forecasted in the future. In one embodiment, drivers include data that may be measured or compared against a threshold. When a threshold is reached or exceeded, service forecast module 390 may trigger a change in a network. In such a manner, when a threshold has been exceeded, service forecast module 390 may initiate the purchase or deployment of a particular piece of network equipment such as a new switch, a new length of fiber, or any other suitable network resource to be deployed in a network. For example, the peek bandwidth utilized by a network exceeding 90 percent of the overall network capacity may initiate the demand for a new switch in the network to increase such network's capacity.

Service forecast module 390 may determine that network equipment is needed to be deployed in a particular network. Upon such a determination, service forecast module 390 may communicate information to network equipment module 360 indicative of the need for the network equipment. In response to receiving such a communication, network equipment module 360 may analyze the communication and determine exactly what type of network equipment is needed to satisfy the need indicated by the drivers of service forecast module 390 and where such equipment should be installed in order to satisfy such need. For example, service forecast module 390 may indicate to network equipment module 360 that an additional switch is needed in a network. However, network equipment module 360 may itself determine the specific type of switch that is needed based on information including such various factors as, for example, cost, current equipment inventory, current preferred vendors, forecasted network growth, type of applications serviced by such switch (i.e. real time or non-real time applications) or at any other suitable factor. Network equipment module 360 may also determine the precise location where such switch is needed, whether or not such location or an alternative location was suggested by service forecast module 390.

After determining the exact equipment type and possible installation site of a particular piece of network equipment, network equipment module 360 may then seek approval for the purchase, installation, or deployment of the network equipment from relevant approval sources within a service provider. In connection with seeking such approval, network equipment module 360 may communicate information to one or more individuals or locations within the service provider. Such information may include, for example, the drivers responsible for initiating such request for approval, thresholds reached, triggers indicated, the particular network equipment involved, the cost of such network approval, the installation location of such equipment, or any other suitable information that may be relevant to a decision maker's approval of the network.

Task module 370 determines one or more of the tasks necessary to complete the deployment of one or more pieces of network equipment communicated to task module 370 by network equipment module 360. Such generation of tasks may, for example, be conducted following network equipment module 360 or task module 370 receiving approval relative to the network equipment from one or more relevant decision makers. More particularly, task module 370 may generate a list of tasks that need to be completed prior to and during the deployment of the network equipment and its installation at a particular location within a network. For example, tasks may include internal approvals, regulatory approvals, building permits, third party approvals, equipment or component purchases, needed fiber to the premise, the assignment of construction personnel, actual installation, testing periods, customer acceptance, or any other suitable task relevant to the purchase, installation or deployment of network equipment. Each task may have a length of time associated with it. For example, one task may have a duration of five days. Another task may have a duration of four hours. Other tasks may have durations dependent on time of day and/or day of the week. For example, certain tasks may only be completed during normal business hours and on normal workdays. Other tasks may be completed over weekends or overnight.

Task module 370 also generally assembles a list of tasks in sequence and may also show interdependencies between tasks. For example, task A may begin. Task B may require waiting until task A is completed before beginning. Task C may be conducted at the same time as task A or after a portion of task A is completed. In such a manner, task module 370 can assemble a list of tasks for any network equipment installation or deployment of another network resource into an overall project for such network equipment. Upon generating a project in the form of a list of tasks, task module 370 may communicate such task list to project module 380.

Project module 380 receives a project in the form of a task list and is responsible for initiating and monitoring the completion of those tasks making up a particular project. For example, project module 380 may determine a time and date by which a particular project needs to be started in order to meet a forecasted need date previously determined by, for example, service forecast module 390 in response to relevant drivers. For example, project module 380 may determine that a particular project to install a piece of network equipment needs to be initiated by May $1^{st}$ in order for all of the tasks in the task list to be completed on a forecasted need date of December $1^{st}$ that was previously determined by service forecast module 350.

Project module 380 may also coordinate the progress of the project using additional project logic. For example, project module 380 may utilize known interdependencies between tasks in order to start individual tasks when permitted and needed during the course of a project. Project module 380 may also track the progress towards completing the task included in the project. Further, project module 380 can coordinate communication with all of the individuals necessary to complete the project and install immediate network equipment. For example, upon task A being completed, project module 380 may instruct an individual to begin project B. At the same time, project module 380 may inform an individual responsible for task F that the task will begin in approximately 72 hours. In such a manner, project module 380 can monitor the completion and progress towards completion of certain tasks and communicate with individuals responsible for tasks to ensure that the overall project moves quickly and efficiently.

Project module 380 may use a variety of electronic messaging to accomplish communications to and from individuals responsible for particular tasks. Such electronic messaging may be automatically generated by project module 380 in the form of automatically generated e-mails, text messages, voice messages, alerts, web postings, or any other suitable form of messaging. Similarly, project module 380 may receive various types of electronic messaging in order to determine that a task has been completed, delayed, or is ready for approval.

In one embodiment, equipment module 360, task module 370, and project module 380 may be utilized to determine the appropriate date for a planning trigger 355 to be initiated prior to a forecasted need date. More particularly, when a plan driver 358 would require the purchase of an additional piece of network equipment or the installation of an additional bundle of fiber at a forecasted need date predicted by module 390, modules 360, 370, and 380 may be utilized to calculate the total amount of lead time prior to the forecasted need date that would be required for the approval, purchase, deployment, installation, testing, and acceptance of such network equipment and fiber. Such a calculation may then be utilized to establish the date of the planning trigger 355.

Figure 4:
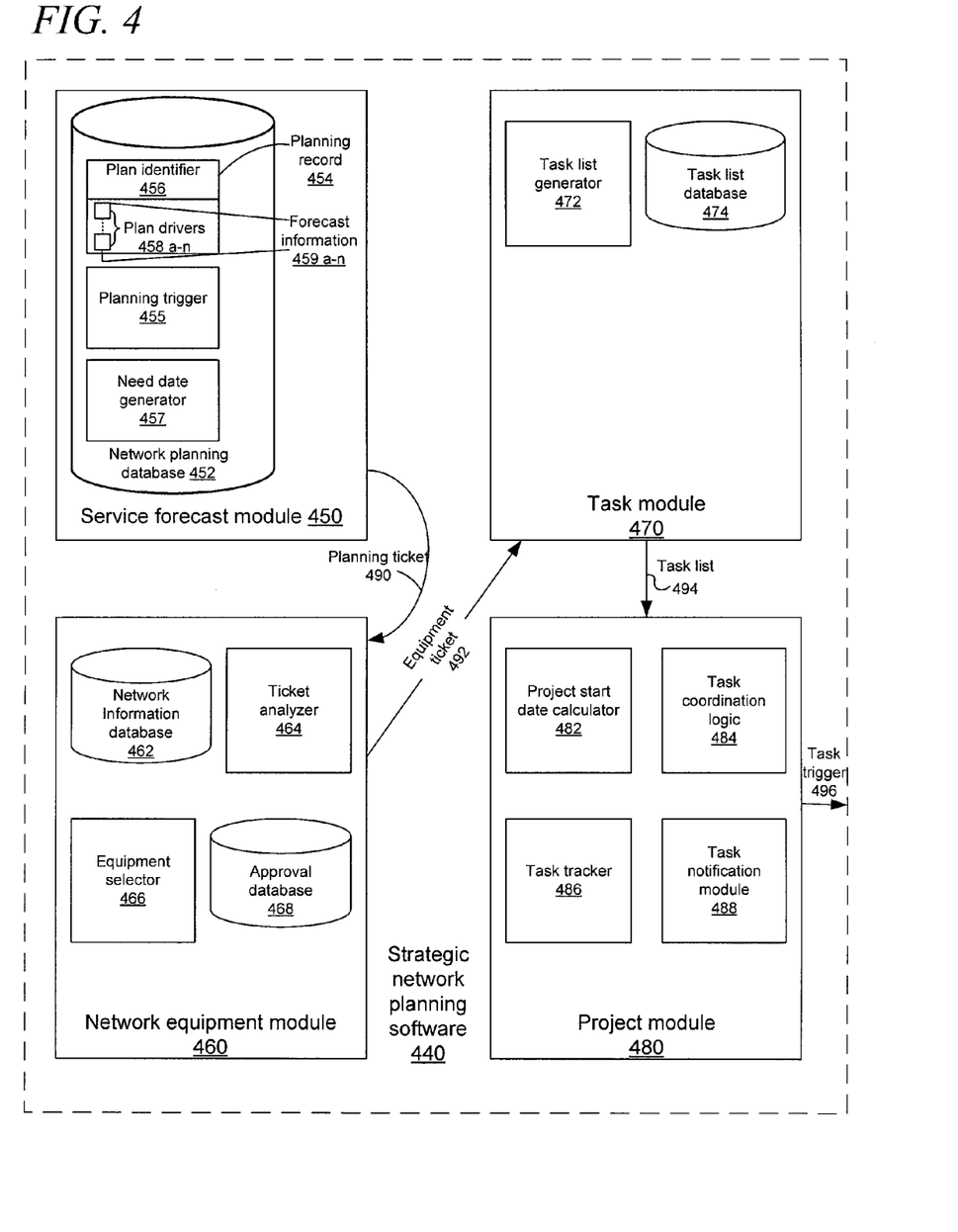
FIG. 4 is an illustration of one embodiment of strategic network planning software.

FIG. 4 illustrates one embodiment of strategic network planning software 440. Strategic network planning software 440 is a software program that may be executed on one or more computer platforms such as, for example, planning server 340 of FIG. 3, or any other suitable computing device. Strategic network planning software 440 includes a service forecast module 450, a network equipment module 460, a task module 470, and a project module 480.

Service forecast module 450 includes a network planning database 452. Network planning database 452 includes one or more planning records 454. Planning records 454 are records that may, for example, be stored in a database. Each planning record 454 may concern a particular network, a particular network segment, a particular network device, or a particular geographic area serviced by a service provider. Each planning record 454 may have a plan identifier 456 that may correspond to a particular network device, node, overall network, or geographic location. In one embodiment, plan identifier 456 may be an identifier corresponding to a particular location or network installation, such as a home office or switching center.

Each planning record 454 may include one or more plan drivers 458a-n referencing drivers that are relevant to planning activities associated with the subject of planning record 454. For example, a plan identifier 456 may correspond to a particular access point to a network of the service provider such as, for example, the access point to a building serviced by a network of the service provider. In such an example, plan drivers 458 may include drivers such as the number of tenants in such building using a network of the service provider, the amount of bandwidth necessary to service clients located in the building of the network, or the capacity of a switch used to service traffic to and from the building. Plan drivers 458a-n may also include forecast information 459a-n that include information relative to the predicted growth, trends, and forecasts relative to driver information.

Network planning database 452 may include one or more planning triggers 455 associated with one or more planning records 454. Planning triggers 455 may be events, thresholds, or network performance information that are associated with the need for additional network equipment. For example, a particular planning trigger 455 may include a threshold at which the usage of a particular network segment is expected to exceed the capacity for that segment based on plan drivers 458 and forecast information 459.

A forecasted need date associated with such threshold may be determined or otherwise generated by a need date generator 457. Need date generator 457 may look at plan drivers and forecast information relative to the use of a network in order to calculate a forecasted need date for a particular piece of network equipment or other change to a network. In such a manner, a gradual increase in the bandwidth utilized over a particular network connection on a monthly basis may be utilized to predict a forecasted need date for expanding such network connection to accommodate additional network traffic.

In association with the forecasted need date, a particular planning trigger 455 may be initiated such that a predetermined length of time before such forecasted need date, an indication is made that the service provider needs to begin planning a deployment of a particular piece of network equipment. In response to planning trigger 455 being met or indicated, service forecast module 455 may generate a planning ticket 490 and communicate such planning ticket 490 to network equipment module 460.

Network equipment module 460 includes a network information database 462, a ticket analyzer 464, an equipment selector 466, and an approval database 468. Network information database 462 includes information regarding the current layout, performance, and utilization of one or more networks of a service provider and the devices and connections associated with such network. For example, network information database 462 may include information regarding the network devices deployed in a network, where they are deployed, how they are connected, how they are configured, traffic operated over such devices, and any other suitable information relative to the performance, configuration, deployment, or location of a network.

Ticket analyzer 464 analyzes planning ticket 490 to determine the type of network equipment necessary to respond to the planning ticket 490. Once ticket analyzer 464 extracts the relevant network equipment information from planning ticket 490, equipment selector 466 uses such information in connection with the information in network information database 462 to select the type of equipment and installation location of the equipment needed relative to a network. Equipment selector 466 may take into account additional factors such as the cost, availability, installation time, installation suitability, and compatibility of particular network equipment available to respond to planning ticket 490.

Once network equipment module 460 has determined the exact type of equipment necessary to respond to planning ticket 490, network equipment module 460 determines the approvals that are necessary to begin the purchase (if necessary), deployment, and installation of the network equipment using approval database 468. Approval database 468 includes the relevant decision makers that are necessary to approve different types of changes to the network such as equipment purchasing, equipment installation, and more whole-sale changes, such as overall network design and configuration changes. Network equipment module 460 may then initiate electronic messages to the identified decision makers in order to approve the initiation of the purchase, deployment, or installation of the network equipment. Although such approvals of approval database 468 are described relative to network equipment module 460, such approval may be obtained and determined by service forecast module 450 earlier in the planning process, or by task module 470 or project module 480 later in the planning process. Alternatively, a separate approval module or messaging module may govern and initiate the communication of such approvals.

Task module 470 receives equipment ticket 492 from network equipment module 460. In response to receiving equipment ticket 492, task module 470 is responsible for determining what tasks are necessary to be complete in order to install the particular piece of network equipment or complete a particular change or addition to a network. Task module 470 includes a task list generator 472 and a task list database 474. Task list generator 472 reviews the equipment ticket 492 received from network equipment module 460 and consults task list database 474 to determine the tasks that are normally associated with an installation of such network equipment. Task list database 474 may also include additional information regarding tasks such as interdependencies between tasks, the length of time necessary to complete such tasks, available substitutes for such tasks, and contingencies in which particular tasks may or may not be needed based on particulars associated with a piece of network equipment. Task list generator 472 assembles a complete list of tasks that are necessary to install a piece of network equipment using the information from task list database 474. Once such task list is generated, the task list 494 is then sent to project module 480.

Project module 480 includes a project start date calculator 482, a task coordination logic 484, a task tracker 486, and a task notification module 488.

Project start date calculator 482 utilizes the forecasted need date that was generated by need date generator 457 and the interdependencies and durations of each of the tasks included in task list 494 to determine a project start date by which the tasks included in task list 494 need to be initiated in order to complete the installation of the network equipment by the forecasted need date. Once such project start date is calculated, in accordance with such calculation, a task trigger 496 may be initiated and communicated to one or more individuals responsible for conducting the first task or first group of tasks within task list 494.

Task coordination logic 484 determines what tasks need to be started when and what tasks are triggered by the completion of other tasks. Task coordination logic 484 communicates with task tracker 486.

In one embodiment, a project start date can be recalculated by project start date calculator based on a modified forecasted need date. In such embodiment, task coordination logic 484 may redetermine tasks, task order, and dates for tasks to be conducted. In one embodiment, a modified forecasted need date may be made after a project has been initiated and after certain tasks involved in such project have already been initiated. In such an embodiment, even though the project start date will not actually change, the determination of tasks, task order, and dates for tasks may still be modified to attempt to achieve task completion by the modified forecasted need date. In one embodiment, such a process may be utilized to determine the increased cost and resources necessary to modify a forecasted need date or other override date entered by a user.

Task tracker 486 keeps tabs on which tasks are completed, which tasks are in progress, and which tasks have not yet been initiated. Task tracker 486 may also track the approval of tasks requiring internal or external approval. In such a manner, task tracker 486 and task coordination 484 may be utilized to ensure that a project consisting of the tasks in task list 494 is conducted quickly and efficiently.

Task notification module 488 is utilized by project module 480 to send advanced, current, or reminder notifications that tasks are to be initiated and to receive notifications that tasks have been completed, stalled, are waiting approval, or relative to other status events associated with particular tasks.

In one embodiment, task notification module 488 communicates for display a project status panel via web interface or other user interface. The project status panel may include a list of all current projects associated with a particular business, group, network, geographic region, or individual. The project status panel may also include a list of all current projects that meet a particular search criteria. In one embodiment, the project status panel includes a status field that displays one of a predefined status indications. For example, a status indication may be scheduled, pending, approved, canceled, on hold, delayed, completed, accepted, testing, or any other suitable indication of status. The status indication may further include or link to a date associated with the last change in status and a date associated with a predicted next change in status. The status indication may further include or link to a record of the individual responsible for making or approving the current status of the project. For example, a status indication of "on hold" may also indicate the name and contact information of the person responsible for placing a project or task on hold. The status indication may include an option to change the current status of a project to authorized users or via other authentication or approval. Notifications may be generated by email or otherwise whenever such a change is made. The project status panel may also include or link to a notes or comments section or window wherein annotations can be made manually or automatically by the system with regard to each project or the status thereof. In such a manner, a reviewer of the project status panel can review notes or comments offering an explanation and context for the current status of a project or the particulars regarding such project's completion.

Figure 5:
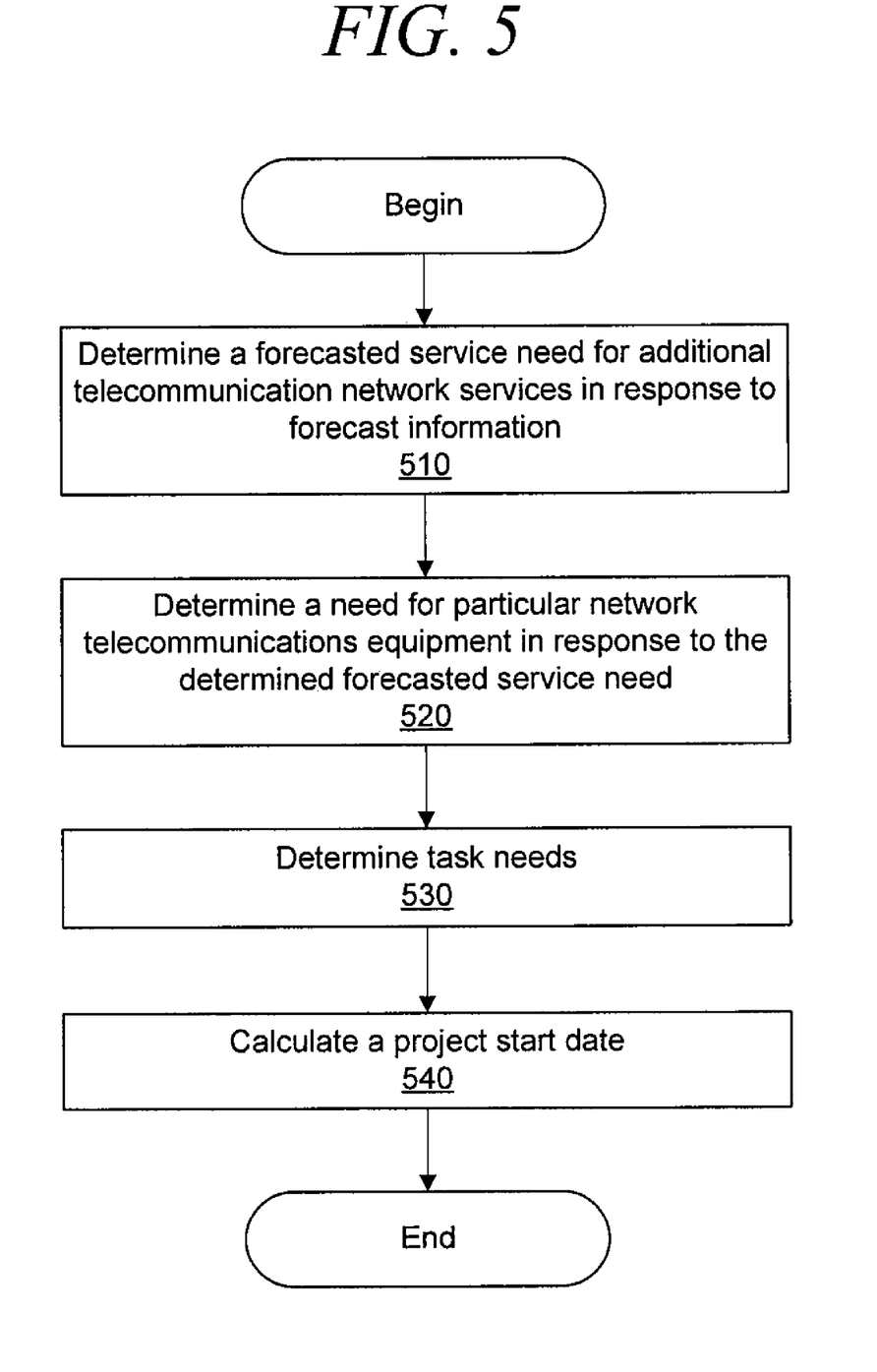
FIG. 5 is an illustration of one embodiment of a process for strategic network planning.

FIG. 5 illustrates one embodiment of a process for strategic network planning. In step 510, a forecasted service need for additional telecommunication network services is determined in response to forecast information. Such forecast information may, for example, regard plan drivers previously described relative to FIGS. 3 and 4. In one embodiment, forecasted information may include factors relevant to the growth of services on a particular network such as new customers to such a network, additional bandwidth requirements of existing customers to such a network, and advancements in technology that are needed to drive services and features that will be desired by the users of such network.

In step 520, a need for particular network telecommunications equipment is determined in response to the determined forecasted service need. The equipment need may include a list of one or more pieces of network equipment that are desired or necessary to meet the forecasted service need. For example, the equipment need may include additional fiber needed to be laid, an additional switch, an upgraded switch, or any other suitable need associated with the use of a network.

In step 530, task needs are determined in response to the determined equipment need. The task needs include a list of tasks that are necessary or desirable to be completed in order to meet the determined equipment need. For example, the list of tasks may include such items as required purchases, required internal and external approvals, required installations, required construction, or any other suitable tasks that need to be completed in order to install and deploy particular network equipment, upgrade, service, or configure equipment, establish additional connections, or any other necessary network change or addition.

In step 540, a project start date is calculated. The project start date is calculated in response to a forecasted need date by which the particular network equipment is needed in order to meet the forecasted service need. The project start date calculation takes into account the forecasted need date and the duration of the tasks included in the list of tasks. For example, a particular lists of tasks may include 12 tasks. If placed end-to-end, the list of tasks would require 144 days to complete. However, because some of such tasks may be completed at the same time, a project start date may be calculated that is actually only 90 days instead of 144 days. Such a determination is made in response to considering the interdependencies of tasks included on the particular list of tasks.

The illustrated process may also include automatically generating a project approval after any of steps 510, 520, 530, or 540. The request may include an indication of one or more drivers that are associated with a need for a forecasted service. For example, as previously described, a project approval may indicate that the equipment or service need is created by one or more of the drivers of customer growth, additional bandwidth, an equipment malfunction, technology advancement, a change in infrastructure, a regulatory change, or a new service offering. Each of the tasks included in the list of tasks may have electronic messages generated upon the initiation or the completion of such tasks.

The previous detailed description is of a small number of embodiments for implementing the invention and is not intended to be limiting in scope. The following claims set forth a number of the embodiments of the invention disclosed with greater particularity.

What is claimed:

1. A system for strategic network planning, the system comprising:
   a processor; a memory storing a service forecast module, a network equipment module, a task module, and a project module, wherein the processor is configured to execute the service forecast module, the network equipment module, the task module, and the project module, the service forecast module configured to determine a forecasted service need for additional telecommunication network services in response to forecast information;
   the network equipment module in communication with the service forecast module, the network equipment module configured to determine an equipment need for telecommunications network equipment in response to the determined forecasted service need, the equipment need including a list of equipment that is desired to meet the forecasted service need;
   the task module in communication with the network equipment module, the task module configured to determine a task needs list in response to the determined equipment need, the task needs list including;
at least one internal approval task,
at least one regulatory approval task,
at least one building permit application task; and
the project module in communication with the task module, the project module configured to calculate a project start date, the project start date calculated in response to the determined task needs, the project module further configured to automatically initiate at least one task by the project start date, the project module further configured to automatically request approval of;
the at least one internal approval task,
the at least one regulatory approval task; and
the at least one building permit application task.

2. The system of claim 1, the request for approval of the at least one internal approval task includes an indication of one or more drivers for the forecasted service need.

3. The system of claim 1, wherein the forecasted service need is determined in response to one or more drivers.

4. The system of claim 1, wherein the forecasted service need is determined in response to one or more drivers, the one or more drivers including one or more of customer growth, bandwidth need, equipment malfunction, technology advancement, infrastructure change, regulatory change, or new service offering.

5. The system of claim 1, wherein the task module is operable to automatically generate an electronic message upon a completion of one of the list of tasks.

6. The system of claim 1, wherein the task module is operable to automatically generate an electronic message upon an initiation of one of the list of tasks.

7. A system for strategic network planning, the system comprising:
a processor;
a memory in communication with the processor;
instructions encoded in the memory, the instructions being configured so that when executed by the processor to:
determine a forecasted service need for additional telecommunication network services in response to forecast information;
determine an equipment need for telecommunications network equipment in response to the determined forecasted service need, the equipment need including a list of equipment that is desired to meet the forecasted service need;
determine task needs in response to the determined equipment need, the task needs including a list of tasks that need to be completed to meet the equipment need, the list of tasks further including;
at least one internal approval task,
at least one regulatory approval task,
at least one building permit application task, and
calculate a project start date, the project start date calculated in response to the determined task needs;
automatically initiate at least one task by the project start date; and
automatically request approval of;
the at least one internal approval task,
the at least one regulatory approval task, and
the at least one building permit application task.

8. The system of claim 7, wherein the instructions are operable when executed by the processor to automatically request approval of the at least one internal approval task, to further include an indication of one or more drivers for the forecasted service need.

9. The system of claim 7, wherein the instructions are further operable when executed by the processor to determine the forecasted service need in response to one or more drivers.

10. The system of claim 7, wherein the instructions are further operable when executed by the processor to determine the forecasted service need in response to one or more drivers, the one or more drivers including one or more of customer growth, bandwidth need, equipment malfunction, technology advancement, infrastructure change, regulatory change, or new service offering.

11. The system of claim 7, wherein the instructions are further operable when executed by the processor to automatically generate an electronic message upon a completion of one of the list of tasks.

12. A computer-implemented method for strategic network planning, the method comprising:
determining, using a processor, a forecasted service need for additional telecommunication network services in response to forecast information;
determining, by the processor, an equipment need for telecommunications network equipment in response to the determined forecasted service need, the equipment need including a list of equipment that is desired to meet the forecasted service need;
determining, by the processor, task needs in response to the determined equipment need, the task needs including a list of tasks that need to be completed to meet the equipment need, the list of tasks further including;
at least one internal approval task,
at least one regulatory approval task,
at least one building permit application task; and
calculating, by the processor, a project start date, the project start date calculated in response to the determined task needs
automatically requesting, by the processor, approval of;
the at least one internal approval task,
the at least one regulatory approval task,
the at least one building permit application task.

13. The method of claim 12, further comprising automatically generating a request for approval of the at least one internal approval task, the request including an indication of one or more drivers for the forecasted service need.

14. The method of claim 12, and further comprising determining the forecasted service need in response to one or more drivers.

15. The method of claim 12, and further comprising determining the forecasted service need in response to one or more drivers, the one or more drivers including one or more of customer growth, bandwidth need, equipment malfunction, technology advancement, infrastructure change, regulatory change, or new service offering.

16. The method of claim 12, and further comprising automatically generating an electronic message upon a completion of one of the list of tasks.

17. The method of claim 12, and further comprising automatically generating an electronic message upon an initiation of one of the list of tasks.

* * * * *